United States Patent [19]

Park

[11] Patent Number: 6,046,323
[45] Date of Patent: Apr. 4, 2000

[54] CONFORMATIONS OF PPG-GLUCAN

[75] Inventor: Jun T. Park, Worcester, Mass.

[73] Assignee: The Collaborative Group, Ltd., Stony Brook, N.Y.

[21] Appl. No.: 08/902,586

[22] Filed: Jul. 29, 1997

[51] Int. Cl.⁷ .............................. C07H 1/00; C07H 3/00
[52] U.S. Cl. ...................................... 536/123.12; 536/124
[58] Field of Search .............................. 536/123.12, 124; 574/54

[56] References Cited

U.S. PATENT DOCUMENTS

| | | | |
|---|---|---|---|
| 4,138,479 | 2/1979 | Truscheit et al. | 424/88 |
| 4,237,266 | 12/1980 | Sugiura et al. | 536/1 |
| 4,707,471 | 11/1987 | Larm et al. | 514/54 |
| 4,739,046 | 4/1988 | Di Luzio | 536/117 |
| 4,761,402 | 8/1988 | Williams et al. | 514/54 |
| 4,810,646 | 3/1989 | Jamas et al. | 536/123 |
| 5,057,503 | 10/1991 | Czop et al. | 514/54 |
| 5,328,829 | 7/1994 | Stashenko | 435/7.9 |
| 5,488,040 | 1/1996 | Jamas et al. | 514/54 |
| 5,622,939 | 4/1997 | Jamas et al. | 514/54 |

FOREIGN PATENT DOCUMENTS

| | | |
|---|---|---|
| 0463540 | 1/1992 | European Pat. Off. . |
| 55-071701 | 8/1980 | Japan . |
| 56-076401 | 9/1981 | Japan . |
| 59-045301 | 6/1984 | Japan . |
| 59-210901 | 4/1985 | Japan . |
| 2076418 | 12/1981 | United Kingdom . |
| 91/03248 | 3/1991 | WIPO . |
| 91/03495 | 3/1991 | WIPO . |
| 92/13896 | 8/1992 | WIPO . |
| 94/03498 | 2/1994 | WIPO . |
| 94/03500 | 2/1994 | WIPO . |
| 94/04163 | 3/1994 | WIPO . |

OTHER PUBLICATIONS

Manners, D.J., et al., "The Structure of a β–(1→3)–D–Glucan from Yeast Cell Walls," *Biochem. J.*, 135: 19–30 (1973).

Onderdonk, A.B., et al., "Anti–Infective Effect of Poly–β1–6–Glucotriosyl–β1–3–Glucopyranose Glucan In Vivo," *Infect. Immun.*, 60(4): 1642–1647 (1992).

Williams, D.L., et al., "Pre–clinical Safety Evaluation of Soluble Glucan," *Int. J. Immunopharmac.*, 10(4): 405–414 (1988).

Janusz, M.J., et al., "Isolation of Soluble Yeast β–Glucan that Inhibit Human Monocyte Phagocytosis Mediated by β–Glucans Receptors," *J. Immunol.*, 137: 3270–3276 (1986).

Miyazaki, T., et al., "Structural Examination of Antitumour, Water–Soluble Glucans from *Grifora umbellata* by Use of Four Types of Glucanese," *Carbohydrate Research*, 65: 235–243 (1978).

Reiskind, J.B. and Mullins, J.T., "Molecular Architecture of the Hyphal Wall of *Achlya ambisexualis* Raper. II. Ultra-structural Analyses and a Proposed Model," *J. Microbiol.*, 27: 1100–1105 (1981).

Sherwood, E.R., et al., "Soluble Glucan and Lymphokine–activated Killer (LAK) Cells in the Therapy of Experimental Hepatic Metastases," *Chemical Abstracts*, 108: 179752V (1988).

Williams, D.L. et al., "Pre–clinical Safety Evaluation of Soluble Glucan," *Chemical Abstracts*, 109: 66566q (1988).

Williams, D.L., et al., "Development of a Water–Soluble, Sulfated (1→3)–β–D–Glucan Biological Response Modifier Derived from *Saccharomyces cerevisiae*," *Carbohydrate Research*, 235: 247–257 (1992).

Hara, C., et al., "A Branched (1→3)–β–D–Glucan From a Water Extract of *Dictyophora indusiata* FISCH," *Carb. Res.*, 145: 237–246 (1986).

Fleet, G.H., et al., "Isolation and Composition of an Alkali–soluble Glucan from the Cell Walls of *Saccharomyces cerevisiae*," *Journal of General Microbiology*, 94: 180–192 (1976).

Sherwood, E.R., et al., "Enhancement of Interleukin–1 and Interleukin–2 Production by Soluble Glucan," *Int. J. Immunopharmac.*, 9(3): 261–267 (1987).

Bacon, J., et al., "The Glucan Components of the Cell Wall of Baker's Yeast (*Saccharomyces Cerevisiae*) Considered in Relation to its Ultrastructure," *BioChem. J.*, 114: 557–567 (1969).

Goldman, R., "Induction of a β–1, 3–D–Glucan Receptor in P388D1 Cells Treated with Retinoic Acid of 1,25–dihydroxyvitamin $D_3$," *Immunology*, 63: 319–324 (1988).

Konopski, Z., et al., "Phagocytosis of β–1,3–D–Glucan–Derivatized Microbeads by Mouse Peritoneal Macrophages Involves Three Different Receptors," *Scand. J. Immunol.*, 33: 297–306 (1991).

Pretus, H.A., et al., "Isolation, Physicochemical Characterization and Preclinical Efficacy Evaluation of Soluble Scleroglucan," *The Journal of Pharmacology and Experimental Therapeutics*, 500–510 (1991).

Williams, D.L., et al., "Development, Physiocochemical Characterization and Preclinical Efficacy Evaluation of Water Soluble Glucan Sulfate Derived from *Saccharomyces cerrevisiae*," *Immunopharmacology*, 22: 139–156 (1991).

Williams, D.L., et al., "A Sequential Multi–Assay Protocol for the Preclinical Assessment of Natural Product Complex Carbohydrate Immunomodulators," *Develop. Biol. Standards.*, 77: 129–136 (1992).

(List continued on next page.)

*Primary Examiner*—Elli Peselev
*Attorney, Agent, or Firm*—Hamilton, Brook, Smith & Reynolds, P.C.

[57] ABSTRACT

The present invention relates to soluble β-glucan compositions. In one embodiment, the invention provides a soluble β-glucan composition which is substantially in a triple helix aggregate conformation under physiological conditions, such as physiological temperature and pH. Such a composition is generally characterized by an aggregate number greater than about 6. The invention further provides methods of preparing β-glucan compositions of this type, as well as methods of characterizing the conformational state of β-glucans.

15 Claims, 7 Drawing Sheets

OTHER PUBLICATIONS

Browder, W., et al., "Beneficial Effect of Enhanced Macrophage Function in the Trauma Patient," *Ann. Surg.*, 211(5): 605–613 (1990).

Chihara, G., et al., "Lentinan as a Host Defense Potentiator (HPD)," *Int. J. Immunotherapy*, V(4): 145–154 (1989).

Stashenko, P., et al., "Reduction Of Infection–Stimulated Periapical Bone Resorption by a Biological Response Modifier PGG Glucan," *J. Dent. Res.* 74(1): 323–330 (1995).

Park, Jun T. et al., "Determination of Aggregation Number Distribution (AND) of Biopolymers: A Novel Multi–Detector SEC with Post Column Delivery System," Abstract ACS National Meeting, Las Vegas (Sep. 7–11, 1997).

Guo, Y.A. et al., "Application of Multi–Detector Sec with Post Column Reaction Systems: Conformational Characterization of PGG–Glucan," Abstract ACS Meeting, Las Vegas (Sep. 7–11, 1997).

Yanaki, Toshio, et al., "Triple Helix and Random Coil of Scleroglucan in Dilute Solution," *Polymer J.*, 15(5): 389–396 (1983).

CONFORMATIONS OF PPG-GLUCAN

BACKGROUND OF THE INVENTION

Underivatized water-soluble β(1-3)-glucan (also referred to as PGG-glucan or BETAFECTIN®) is a unique soluble β-glucan which is prepared via a proprietary process. The biological activity of this polysaccharide differs from that of particulate or other soluble β-glucans. Several laboratories have reported direct induction of arachidonic acid metabolites (Czop et al., *J. Immunol.* 141: 3170–3176 (1988)), cytokines (Abel and Czop, *Intl. J. Immunopharmacol.* 14: 1363–1373 (1992); Doita et al., *J. Leuk. Biol.* 14: 173–183 (1992)) and oxidative burst (Cain et al., *Complement* 4: 75–86 (1987); Gallin et al., *Int. J. Immunopharmacol.* 14: 173–183 (1992)) by both particulate and soluble forms of β-glucans. In contrast, soluble β(1-3)-glucan does not directly activate leukocyte functions such as oxidative burst activity (Mackin et al. *FASEB J.* 8:A216 (1994)), cytokine secretion (Putsiaka et al. *Blood* 82: 3695–3700 (1993)) or proliferation (Wakshull et al. *J. Cell. Biochem. suppl.* 18A: 22 (1994)). Instead, soluble β(1-3)-glucan primes cells for activation by secondary stimuli (Mackin et al. (1994); Brunke-Reese and Mackin, *FASEB J.* 8: A488 (1994); and Wakshull et al. (1994)).

The biological activity of β-glucans is mediated through specific receptors on target cells. Several investigators have described receptors which bind particulate β-glucan preparations. For example, receptors for particulate β-glucan (e.g., zymosan-like particles) have been described by Czop and colleagues (Czop and Kay, *J. Exp. Med.* 173: 1511–1520 (1991); Szabo et al., *J. Biol. Chem.* 270: 2145–2151 (1995)) and Goldman (*Immunology* 63 319–324 (1988); *Exp. Cell Res.* 174: 481–490 (1988)). The leukocyte complement receptor 3 (CR3, also known as MAC 1 or CD11b/CD18) has been shown to have the capacity to bind particulate and some soluble β-glucans, as well as other polysaccharides (Thornton et al., *J. Immunol.* 156: 1235–1246 (1996)). A soluble aminated β-glucan preparation has been shown to bind to murine peritoneal macrophages (Konopski et al., *Biochim Biophys. Acta* 1221: 61–65 (1994)), and a phosphorylated β-glucan derivative has been reported to bind to monocyte cell lines (Muller et al., *J. Immunol.* 156: 3418–3425 (1996)). The ability of salmon macrophages (Engstad and Robertson, *Dev. Comp. Immunol.* 18: 397–408 (1994)) and brain microglial cells (Muller et al., *Res. Immunol.* 145: 267–275 (1994)) to phagocytose β-glucan particles, presumably through a receptor-mediated process, has also been described.

Each of the foregoing studies utilized β-glucan preparations varying widely in source, method of preparation, purity and degree of characterization. Because of this, little information is available regarding the relationship between β-glucan structure/conformation and biological activity. There is, thus, a need for an improved understanding of β-glucan structure/activity relationships to aid in the development of novel β-glucan compositions with improved biological activity.

SUMMARY OF THE INVENTION

The present invention relates to soluble, non-gelling, β-glucan compositions. In one embodiment, the invention provides a soluble β-glucan composition which is substantially in a triple helix conformation under physiological conditions, such as physiological temperature and pH. Such a composition is characterized by an aggregate number greater than about 6 (i.e., an aggregate of more than two triple helices composed of six β-glucan chains).

The present invention also provides a method of producing a soluble β-glucan composition having a greater aggregate number than a starting soluble β-glucan composition, comprising separating a high molecular weight portion from the starting soluble β-glucan, said high molecular weight portion having a greater aggregate number than the starting composition. In one embodiment, the high molecular weight portion is separated from the remainder of the starting composition by gel permeation chromatography.

In another embodiment, the present invention also provides a method of preparing a soluble β-glucan composition having an aggregate number lower than that of a starting soluble β-glucan composition. The method comprises separating a low molecular weight portion from a starting soluble β-glucan composition. The low molecular weight portion is enriched in the single triple helix and/or single helix conformation compared to the starting composition.

In a further embodiment, the invention includes a method of forming a β-glucan composition wherein at least a portion of the β-glucan polymer chains adopt a triple helix aggregate conformation under physiological conditions. The method comprises the steps of (1) reacting a highly branched β-glucan under conditions sufficient to remove a portion of the branches, thereby forming a partially debranched β-glucan and (2) maintaining the partially debranched β-glucan under conditions sufficient for formation of a triple helix aggregate conformation.

In yet another embodiment, the invention provides a method of determining the aggregate number distribution across the entire molecular weight range of a polysaccharide composition. The method comprises the steps of (1) directing a first aliquot of a β-glucan solution through a gel permeation chromatography column to obtain a β-glucan fraction; (2) determining the molecular weight of the β-glucan fraction; (3) directing a second aliquot of the β-glucan solution through a gel permeation chromatography column to obtain a second β-glucan fraction corresponding to the β-glucan fraction of step (1); (4) contacting the second β-glucan fraction with alkali to denature the second β-glucan fraction into single polymer chains; (5) determining the molecular weight of the β-glucan fraction as single polymer chains; and (6) dividing the molecular weight determined in step (2) by the molecular weight determined in step (5) to obtain the aggregate number of the β-glucan fraction. This method enables the determination of the aggregate number distribution across the entire range of β-glucans.

The present invention offers several advantages. For example, the soluble β-glucan compositions of the invention are enriched in one or more triple helix aggregate conformations compared to prior art β-glucans. The invention also provides novel methods of preparing and characterizing such β-glucans.

DETAILED DESCRIPTION OF THE INVENTION

PGG-glucan is a polysaccharide composed of glucopyranose units linked in chains via β(1,3)-glycosidic bonds, with branches intermittently linked to the main chain via β(1,6)-glycosidic bonds. Single chains can be isolated, i.e., not substantially interacting with another chain. Three single helix chains can also combine to form a triple helix structure which is held together by interchain hydrogen bonding. Two or more β-glucan triple helices can join together to form a triple helix aggregate. A β-glucan polysaccharide can exist in at least four distinct conformations: single disordered chains, single helix, single triple helix and triple helix aggregates. Preparations of the β-glucan can comprise one or more of these forms, depending upon such conditions as pH and temperature.

The term "single triple helix", as used herein, refers to a β-glucan conformation wherein three single chains are joined together to form a triple helix structure. In this conformation, there is no higher ordering of these triple helices, that is, there is no substantial aggregation of triple helices.

The term "triple helix aggregate", as used herein, refers to a β-glucan conformation in which two or more triple helices are joined together via non-covalent interactions.

The "molecular weight" of a β-glucan composition, as the term is used herein, is the mass average molar mass of the collection of polymer molecules within the composition. The characterization of a collection of polymer molecules in terms of polymer mass average molar mass is well known in the art of polymer science.

The "aggregate number" of a β-glucan conformation is the number of single chains which are joined together in that conformation. The aggregate number of a single helix is 1, the aggregate number of a single triple helix is 3, and the aggregate number of a triple helix aggregate is greater than 3. For example, a triple helix aggregate consisting of two triple helices joined together has an aggregate number of 6.

The aggregate number of a β-glucan sample under a specified set of conditions can be determined by determining the average molecular weight of the polymer under those conditions. The β-glucan is then denatured, that is, subjected to conditions which separate any aggregates into their component single polymer chains. The average molecular weight of the denatured polymer is then determined. The ratio of the molecular weights of the aggregated and denatured forms of the polymer is the aggregate number. A typical β-glucan composition includes molecules having a range of chain lengths, conformations and molecular weights. Thus, the measured aggregate number of a β-glucan composition is the mass average aggregate number across the entire range of β-glucan molecules within the composition. It is to be understood that any reference herein to the aggregate number of a β-glucan composition refers to the mass average aggregate number of the composition under the specified conditions. The aggregate number of a composition indicates which conformation is predominant within the composition. For example, a measured aggregate number of about 6 or more is characteristic of a composition in which the β-glucan is substantially in the triple helix aggregate conformation.

Figure 1:
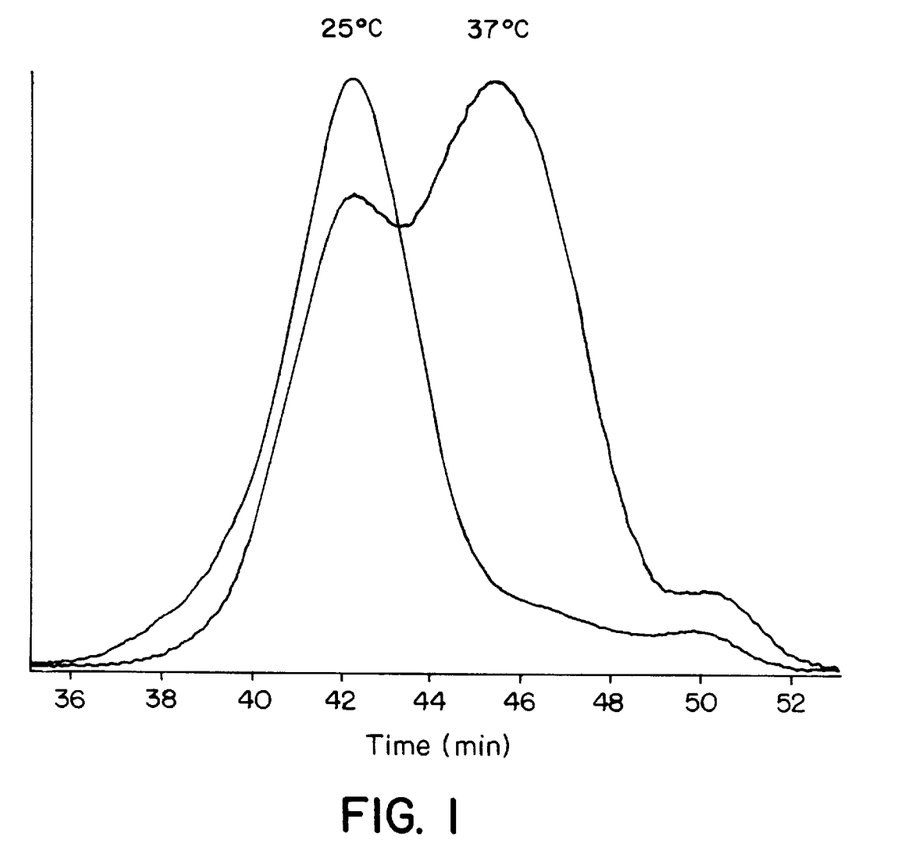
FIG. 1 presents the elution profiles of a prior art PGG-glucan composition at 25° C. and 37° C.
Figure 2:
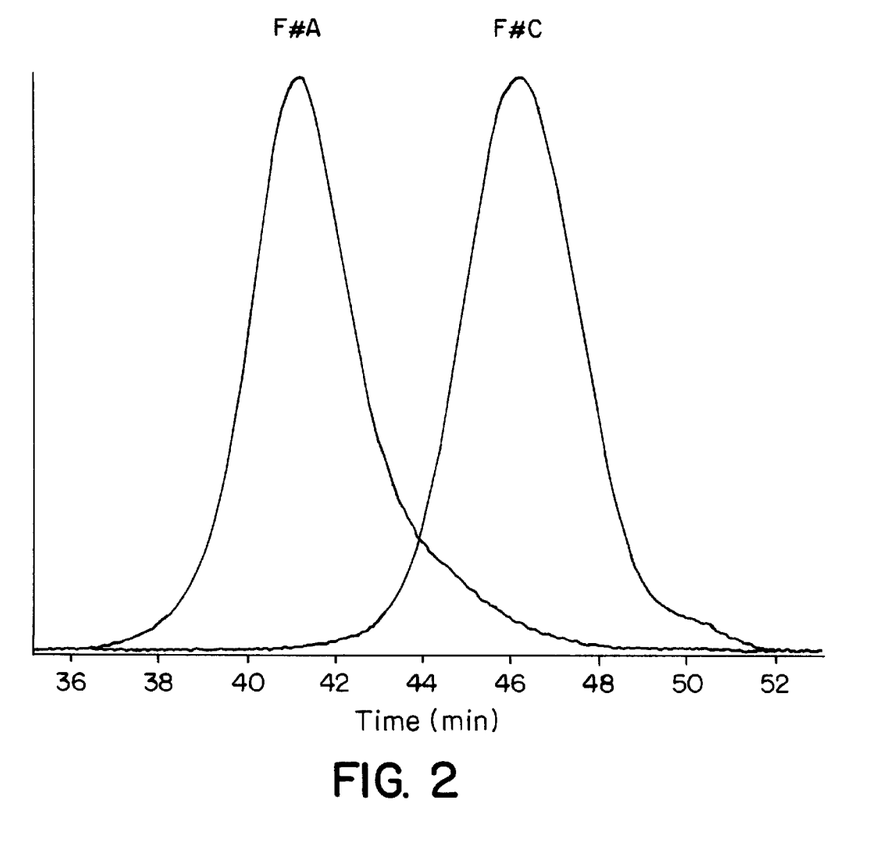
FIG. 2 presents an overlay of the analytical GPC elution profile of Fractions A and C at 37° C.

The present invention is predicated upon the discovery that the conformation of a PGG-glucan preparation is temperature dependent. For example, as described in Example 1, an aqueous PGG-glucan solution prepared according to the method disclosed in U.S. Pat. No. 5,622,939, incorporated herein by reference, elutes from a gel permeation chromatography column (GPC, also referred to as size exclusion chromatography) at 25° C. as a single symmetric peak. When the elution is conducted at 37° C. however, two distinct peaks are observed, denoted Fraction A, which elutes first, and Fraction C, which elutes last. The elution profiles of the PGG-glucan preparation at 25° C. and 37° C. are shown in FIG. 1.

The molecular weights of fractions A and C were determined at 25° C. at both pH 7 and pH 13, and at 37° C. at pH 7. At pH 13, PGG-glucan is in an unaggregated or single chain conformation. Thus, at a given temperature the ratio of the molecular weights determined at pH 7 and pH 13 is the aggregate number at pH 7 at that temperature.

At pH 7 and 25° C., Fraction A had a molecular weight of 238,000 and an aggregate number of 15.0. Upon increasing the temperature to 37° C., the molecular weight of Fraction A decreased to 164,000 and the aggregate number decreased to 10.3. At 75° C. the molecular weight of this fraction was 52,600 with an aggregate number of 3.3. The temperature dependence of molecular weight and aggregate number was more pronounced for Fraction C. At pH 7.0 and 25° C., Fraction C had a molecular weight of 71,500 and an aggregate number of 6.0. At 37° C., the molecular weight of Fraction C was 32,000 and the aggregate number was 2.7. At 75° C., the molecular weight of this fraction was 17,200 and the aggregate number was 1.4.

The results of this study indicate that at 25° C. and pH 7, both Fraction A and Fraction C exist predominantly in a triple helix aggregate conformation. When the temperature is increased to 37° C., Fraction A remains predominantly in a triple helix aggregate conformation, while Fraction C is primarily in a single triple helix conformation. At 75° C., Fraction A remains predominantly in a single triple helix conformation, while Fraction C is primarily in a single chain random coil conformation.

Figure 7:
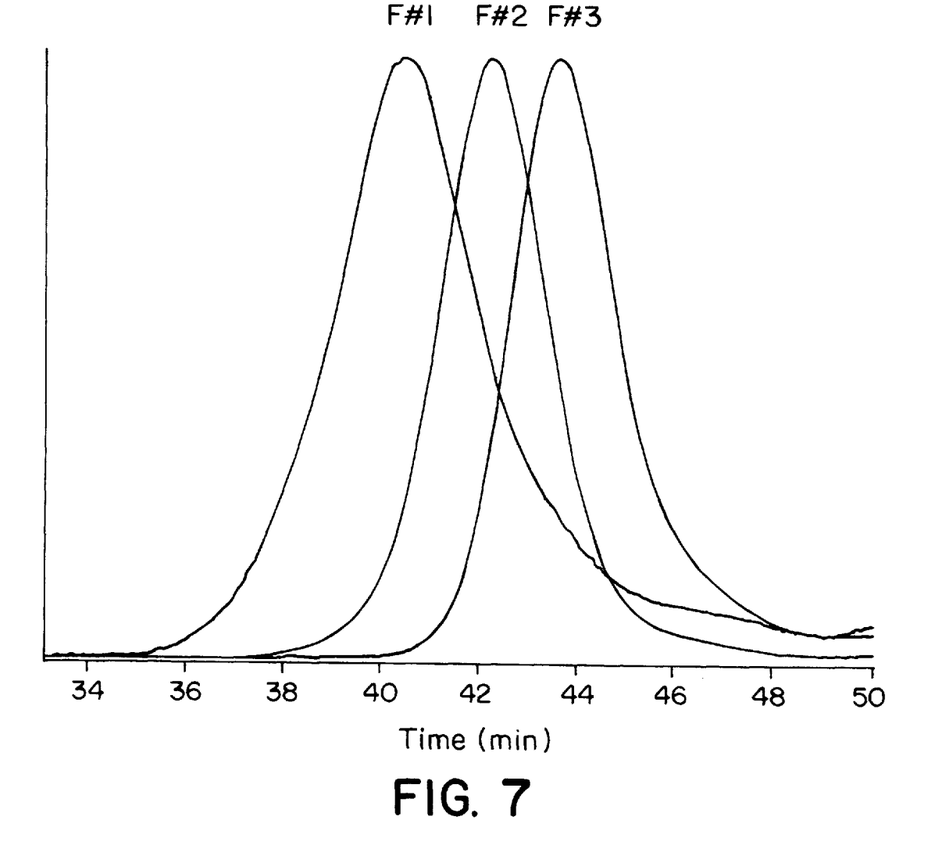
FIG. 7 is an overlay of the elution profiles of Fractions 1, 2 and 3 on an analytical gel permeation chromatography column at 25° C.

In another series of experiments, described in Example 3, the original PGG-glucan preparation described above was subjected to preparative scale GPC at 25° C., resulting in a single broad elution band. Portions from the leading and trailing edges and the center of this band were collected to provide, in order of elution, Fractions 1, 2 and 3. An overlay of the analytical GPC elution profile of each of these fractions is shown in FIG. 7. The average molecular weight of each fraction was determined at both pH 7 and pH 13. The results showed that both molecular weight and aggregate number decreased with increasing elution time. The molecular weights determined at 25° C. ranged from 244,100 for Fraction 1, 156,600 for Fraction 2, and 104,300 for Fraction 3. The aggregate numbers determined at 25° C. were 11.3 for Fraction 1, 8.6 for Fraction 2 and 7.7 for Fraction 3.

The average molecular weight and aggregate number of each fraction were temperature dependent. For each fraction, both average molecular weight and aggregate number decreased upon warming from 25° C. to 37° C. The molecular weights (aggregate numbers) determined at 37° C. were 164,100 (7.6) for Fraction 1, 109,100 (6.0) for Fraction 2, and 51,760 (3.8) for Fraction 3.

These results indicate that in each fraction the PGG-glucan is predominantly in a triple helix aggregate conformation at 25° C. At 37° C., however, Fractions 1 and 2 remain predominantly in a triple helix aggregate conformation, while Fraction 3, however, is primarily in a single triple helix conformation.

The aggregation state of another β-glucan, known as scleroglucan, was also examined. Scleroglucan is a β-glucan polymer which is substantially more branched than PGG-glucan. Based upon the molecular weights of a scleroglucan sample at 25° C. at pH 7 and pH 13 and at 37° C. and pH 7, the aggregate number of this sample was determined to be about 3 at both temperatures. Thus while PGG-glucan exists in a triple helix aggregate conformation at 25° C. and pH 7, under these conditions scleroglucan exists primarily in a single triple helix conformation.

The differences in the conformations of scleroglucan and PGG-glucan can be ascribed to structural differences between the two β-glucans. As the primary structural difference is the extent of branching, this suggests that scleroglucan is too highly branched to form triple helix aggregates under these conditions. This indicates that a β-glucan which forms triple helix aggregates at physiological temperature and pH can be formed by debranching a highly branched β-glucan such as scleroglucan.

The present invention provides a soluble β-glucan composition which is substantially in a triple helix aggregate conformation under physiological conditions. A "soluble β-glucan composition", as the term is used herein, is an underivatized β-glucan composition which dissolves in an aqueous medium at room temperature (about 20–25° C.) and neutral pH (from about pH 5.5 to about 7.5) to form a visually clear solution at a concentration up to about 100 mg/mL. An "aqueous medium", as the term is used herein, refers to water or a water-rich phase, particularly physiologically acceptable aqueous phases, including phosphate-buffered saline, saline and dextrose solutions.

The term "physiological conditions", as used herein, refers to physiological pH, about pH 7, and physiological temperature, about 37° C. In a preferred embodiment, under physiological conditions the β-glucan composition consists essentially of β-glucan chains in one or more triple helix aggregate conformations.

As used herein, a soluble β-glucan composition is "substantially in a triple helix conformation" if greater that about 50% by weight of the composition is in a triple helix aggregate conformation under physiological conditions. Preferably, greater than about 60%, and more preferably, greater than about 70% by weight of the composition is in a triple helix aggregate conformation under physiological conditions. In one embodiment, the soluble β-glucan composition of the invention is characterized by an aggregate number under physiological conditions of greater than about 6. Preferably, the aggregate number of the β-glucan composition under physiological conditions is at least about 7, and, more preferably, at least about 8. In the most preferred embodiment, the aggregate number of the β-glucan composition under physiological conditions is at least about 9.

The soluble β-glucan composition can be prepared from insoluble glucan particles, preferably derived from yeasts, as described in U.S. Pat. No. 5,622,939. A general procedure for the preparation of insoluble yeast glucans is provided by Manners et al., *Biol. J.* 135: 19–30 (1973). Glucan particles which are particularly useful as starting materials in the present invention are whole glucan particles as described by Jamas et al. in U.S. Pat. Nos. 4,810,646, 4,992,540, 5,082, 936, 5,028,703 and 5,622,939, the teachings of each of which are incorporated herein by reference in their entirety. The source of the whole glucan particles can be any fungal organism which contains β-glucans in its cell walls. Particularly useful are whole glucan particles obtained from the strains *Saccharomyces cerevisiae* R4 (NRRL Y-15903) and R4 Ad (ATCC No. 74181). Other strains of yeast which are suitable sources of whole glucan particles include *Saccharomyces delbruekii, Saccharomyces rosei, Saccharomyces microellipsodes, Saccharomyces carlsbergensis, Schizosaccharomyces pombe, Kluyveromyces lactis, Kluyveromyces fragilis, Kluyveromyces polysporus, Candida albicans, Candida cloacae, Candida tropicalis, Candida utilis, Hansenula wingei, Hansenula arni, Hansenula henricii* and *Hansenula americana*.

In another embodiment, the present invention provides a method of preparing a soluble β-glucan composition having an aggregate number greater than that of a starting soluble β-glucan composition. The method comprises separating a high molecular weight portion from a starting soluble β-glucan composition. The high molecular weight portion is enriched in the triple helix aggregate conformation compared to the starting composition. The starting composition can be, for example, a β-glucan composition having an aggregate number less than about 6 under specified conditions. In one embodiment, the high molecular weight fraction which is separated from the starting composition is substantially in a triple helix aggregate conformation under physiological conditions. The high molecular weight portion can be any portion of the starting composition, as long as it has a greater average molecular weight than that of the starting composition. In one embodiment, the isolated portion represents about 60% or less, by weight, of the starting composition. The fraction of the starting composition isolated will depend upon the dispersion of molecular weights within the starting composition and the aggregate number desired and can be readily determined by one of skill in the art.

The high molecular weight portion can be separated from the starting composition using a variety of techniques. In a preferred embodiment, the high molecular weight portion is separated from the remainder of the starting composition using gel permeation chromatography (GPC). In this embodiment, the high molecular weight portion is separated from the starting composition by a method comprising the steps of (1) directing a β-glucan composition through a gel permeation chromatography column, and (2) collecting a high molecular weight fraction or a high molecular weight portion of a fraction of the starting composition.

In one embodiment, the starting β-glucan composition is separated into two or more fractions by GPC. In this case, the faster eluting fraction is a high molecular weight portion of the starting composition and all or a part of this fraction can be collected. In another embodiment, the starting β-glucan composition elutes as a single fraction or two or more overlapping fractions. In this case, the leading edge of the fraction or overlapping fractions can be collected.

The "leading edge" of a fraction eluting from a chromatography column is the portion of the fraction which elutes first. For example, if the fraction elutes in a given volume of eluent, the first 10 to 50% by volume of the fraction can be collected. The amount of the β-glucan fraction to be collected depends upon the nature of the original β-glucan composition, for example, the distribution of molecular weights and conformations, and the chromatography conditions, such as the type of GPC column employed, the eluent and the flow rate. Optimization of these parameters is within the ordinary level of skill in the art. β-Glucan molecules having higher aggregate numbers are expected to elute first. Therefore, if the portion collected has an aggregate number under physiological conditions which is lower than desired, the original β-glucan composition can be fractionated again, and a smaller leading edge portion can be collected to obtain a β-glucan composition having a larger aggregate number under physiological conditions. Preferably, the parameters are optimized using an analytical scale GPC column.

A suitable β-glucan composition having an aggregate number at physiological temperature of less than about 6 is a PGG-glucan composition previously described in U.S. Pat. No. 5,622,939. Preparative scale GPC can be performed to fractionate such a composition as described in Example 3. For example, if the β-glucan composition elutes from the GPC column as a single band, the earlier-eluting, or leading edge, portion of the elution band can be collected to yield a PGG-glucan composition having an aggregate number greater than about 6. Such a β-glucan composition will have an increased triple helix aggregate conformer population at physiological temperature and pH compared to the original preparation.

The present invention also provides a method of preparing a soluble β-glucan composition having an aggregate number lower than that of a starting soluble β-glucan composition. The method comprises separating a low molecular weight portion from a starting soluble β-glucan composition. The low molecular weight portion is enriched in a single triple helix and/or single helix conformation compared to the starting composition. In one embodiment, the low molecular weight portion which is separated from the starting composition is substantially in a single triple helix conformation under physiological conditions. The low molecular weight portion can be any portion of the starting composition, as long as it has a lower average molecular weight than that of the starting composition. In one embodiment, the isolated portion represents about 60% or less, by weight, of the starting composition. The fraction of the starting composition separated will depend upon the dispersion of molecular weights within the starting composition and the aggregate number desired and can be readily determined by one of skill in the art.

The low molecular weight portion can be separated from the starting composition using a variety of techniques. In a preferred embodiment, the low molecular weight portion is separated from the remainder of the starting composition using gel permeation chromatography. In this embodiment, the high molecular weight portion is separated from the starting composition by a method comprising the steps of (1) directing a β-glucan composition through a gel permeation chromatography column, and (2) collecting a low molecular weight fraction or a low molecular weight portion of a fraction of the starting composition.

In one embodiment, the starting β-glucan composition is separated into two or more fractions by GPC. In this case, the more slowly eluting fraction is a low molecular weight portion of the starting composition and all or a part of this fraction can be collected. In another embodiment, the starting β-glucan composition elutes as a single fraction or two or more overlapping fractions. In this case, the trailing edge of the fraction or overlapping fractions can be collected.

The "trailing edge" of a fraction eluted from a chromatography column is that portion of the fraction which elutes last. For example, if the fraction elutes in a given volume of eluent, the last 10 to 50% of the fraction can be collected. The amount of the β-glucan fraction to be collected depends upon the nature of the original β-glucan composition, for example, the distribution of molecular weights and conformations, and the chromatography conditions, such as the type of gel permeation chromatography column employed, the eluent and the flow rate. Optimization of these parameters is within the ordinary level of skill in the art. β-Glucan molecules which adopt a single triple helix conformation under physiological conditions are expected to elute last. Therefore, if the portion collected has an aggregate number under physiological conditions which is greater than desired, the original β-glucan composition can be fractionated again, and a smaller trailing edge portion can be collected to obtain a β-glucan composition having a smaller aggregate number under physiological conditions. Preferably, the parameters are optimized using an analytical scale GPC column.

The present invention also includes a method for determining the aggregate number distribution of a β-glucan composition across the entire molecular weight range of the composition. The method comprises the steps of (1) directing a first aliquot of a β-glucan solution through a gel permeation chromatography column to obtain a β-glucan fraction; (2) determining the molecular weight of the β-glucan fraction; (3) directing a second aliquot of the β-glucan solution through a gel permeation chromatography column to obtain a β-glucan fraction corresponding to the β-glucan fraction of step (1); (4) denaturing the β-glucan fraction into single β-glucan chains; (5) determining the molecular weight of the fraction as single polymer chains; and (6) dividing the molecular weight determined in step (2) by the molecular weight determined in step (5) to obtain the aggregate number of the β-glucan fraction. In this way, the aggregate number distribution of a β-glucan composition across the entire molecular weight range of the composition is obtained.

The gel permeation chromatography column can be a gravity column or a high performance liquid chromatography (HPLC) column. Optionally, the β-glucan solution can be fractionated by passage through two or more gel permeation chromatography columns.

The β-glucan fraction can be denatured, for example, by treatment with aqueous base or dimethyl sulfoxide. The aqueous base can be any alkaline solution having a sufficiently high pH to denature the β-glucan into single helices or disordered polymer chains. Suitable bases include aqueous KOH, NaOH and LiOH. For example, the aqueous solution can have a pH of about pH 12 or greater, preferably about pH 13 or greater.

In one embodiment, the method of determining the aggregate number of a β-glucan fraction described above is carried out using an apparatus comprising a gel permeation chromatography column, a post-column reaction system and a device for determining the molecular weight of the resulting fractions. The post-column reaction system enables the delivery of the denaturing reagent, such as an aqueous base, to the effluent from the GPC column, such that each fraction eluted from the GPC column can be denatured prior to determining the molecular weight of the fraction.

The molecular weight of the β-glucan fraction can be determined using a variety of methods. For example, suitable methods include light scattering techniques, such as multi-angle laser light scattering (MALLS), on-line viscometry, ultracentrifugation, osmometry, and other methods known in the art of polymer science.

Figure 3:
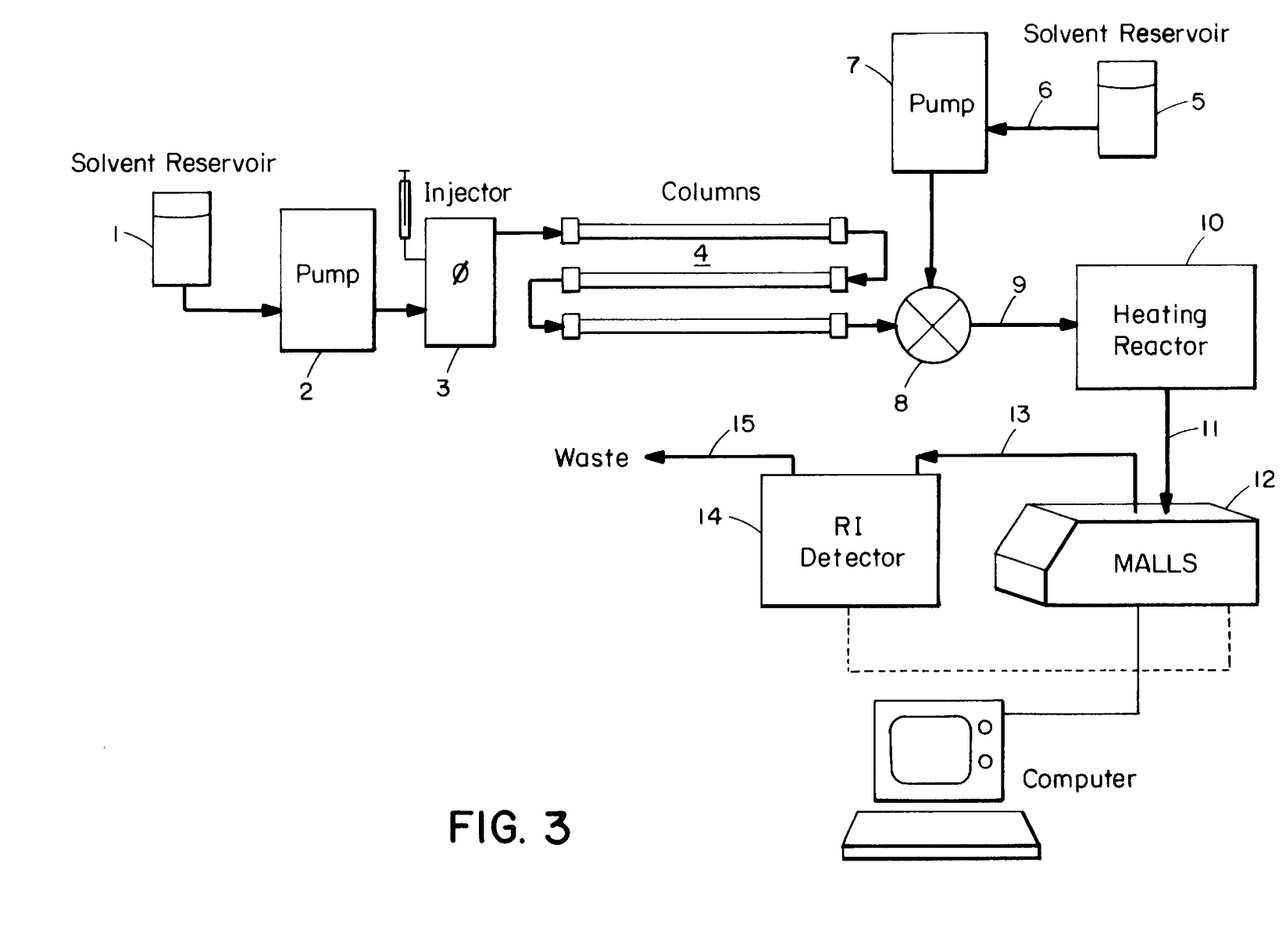
FIG. 3 is a schematic depiction of an apparatus useful for the determination of the aggregate number distribution of a β-glucan composition.

An example of an apparatus which is of use in the method of the invention is depicted schematically in FIG. 3. The apparatus includes a standard HPLC system comprising first solvent reservoir 1, pump 2, an injector 3, and one or more gel permeation chromatography columns 4. Second solvent reservoir 5 is linked via line 6 to second pump 7, which is in turn linked via tee 8 to effluent line 9. Effluent line 9 is connected to heating reactor 10 which is connected by line 11 to multi-angle laser light scattering detector (MALLS) 12. The MALLS is connected by line 13 to refractive index (RI) detector 14 which is connected to waste outlet 15.

Reservoirs 1 and 5 can be, for example, Kontes 5 liter Ultra-Ware Conical Bottom reservoirs (Kontes). Suitable pump for use in this system (pumps 2 and 7) include Hitachi L-6000 (Hitachi). Injector 3 can be, for example, an Hitachi AS-4000 injector. The system can include one or more gel permeation chromatography columns, for example, two Shodex KB-804 columns and one Shodex KB-803 columns. Tee 8 can be an Upchurch static mixing tee. A suitable heating reactor is an Eppendorf CH-460 heater with temperature controller. Multi-angle laser light scattering detector 12 can be, for example, a Wyatt Technology MINIDAWN™. Suitable refractive index detectors include the Knauer Model 98 detector.

In a further embodiment, the present invention provides a method of forming a β-glucan composition comprising β-glucan chains which are in a triple helix aggregate conformation. The method comprises the steps of (1) reacting a highly branched β-glucan under conditions sufficient to remove at least a portion of the branches to form a debranched β-glucan and (2) maintaining the debranched β-glucan under conditions sufficient for formation of a triple helix aggregate form.

The highly branched β-glucan is a β-glucan which is substantially more branched than PGG-glucan, for example, a β-glucan which is too highly branched to form triple helix aggregates. For example, the highly branched β-glucan can be at least about 25% branched. In a preferred embodiment, the branches are joined to the main chain via β(1,6)-glycosidic bonds. Suitable examples of highly branched β-glucans of this type include scleroglucan, which is about 30–33% branched, schizophyllan, lentinan, cinerean, grifolan and pestalotan.

The highly branched β-glucan can be debranched by cleaving a portion of the bonds joining the branches to the main polymer chain. For example, when the branches are joined to the main polymer chain by β(1,6)-glycosidic bonds, the β(1,6)-glycosidic bonds can be hydrolyzed under conditions which leave the main polymer chain substantially intact. For example, hydrolysis of the β(1,6)-glycodsidic bonds can be catalyzed by an enzyme which preferentially cleaves β(1,6)-glycosidic bonds over β(1,3)-glycosidic bonds. Such enzymes of this type include hydrolases which are specific for or preferentially cleave β(1,6)-glycosidic bonds, for example, endoglycosidases, such as β(1,6)-glycosidases (Sasaki et al., *Carbohydrate Res.* 47: 99–104 (1976)).

The highly branched β-glucan can also be debranched using chemical methods. A preferred chemical debranching method is the Smith degradation (Whistler et al., *Methods Carbohydrate Chem.* 1: 47–50 (1962)). In this method the β-glucan is treated for about 3 days in the dark with a limiting amount of $NaIO_4$, based on the extent of debranching desired. The reaction is next quenched with ethylene glycol and dialyzed. The reaction mixture is then treated with excess $NaBH_4$, then quenched with acetic acid and dialyzed. The reaction mixture is then heated for about 3 hours at 80° C. with 0.2 M trifluoroacetic acid. The reaction mixture is then dialyzed and concentrated.

The debranching reaction is performed under conditions suitable for forming a β-glucan composition which is sufficiently debranched to permit triple helix aggregate formation. For example, in one embodiment, the extent of branching of the debranched β-glucan is less than about 10%. In a preferred embodiment, the debranched β-glucan is branched to substantially the same extent as PGG-glucan (about 7%).

The soluble β-glucan compositions of the present invention have utility as safe, effective, therapeutic and/or prophylactic agents, either alone or as adjuvants, to enhance the immune response in humans and animals. Soluble β-glucans produced by the present method preferably selectively activate only those components that are responsible for the initial response to infection, without stimulating or priming the immune system to release certain biochemical mediators (e.g., IL-1, TNF, IL-6, IL-8 and GM-CSF) that can cause adverse side effects. As such, the present soluble glucan composition can be used to prevent or treat infectious diseases in malnourished patients, patients undergoing surgery and bone marrow transplants, patients undergoing chemotherapy or radiotherapy, neutropenic patients, HIV-infected patients, trauma patients, burn patients, patients with chronic or resistant infections such as those resulting from myelodysplastic syndrome, and the elderly, all of who may have weakened immune systems. An immunocompromised individual is generally defined as a person who exhibits an attenuated or reduced ability to mount a normal cellular or humoral defense to challenge by infectious agents, e.g., viruses, bacteria, fungi and protozoa. A protein malnourished individual is generally defined as a person who has a serum albumin level of less than about 3.2 grams per deciliter (g/dl) and/or unintentional weight loss of greater than 10% of usual body weight.

More particularly, the method of the invention can be used to therapeutically or prophylactically treat animals or humans who are at a heightened risk of infection due to imminent surgery, injury, illness, radiation or chemotherapy, or other condition which deleteriously affects the immune system. The method is useful to treat patients who have a disease or disorder which causes the normal metabolic immune response to be reduced or depressed, such as HIV infection (AIDS). For example, the method can be used to pre-initiate the metabolic immune response in patients who are undergoing chemotherapy or radiation therapy, or who are at a heightened risk for developing secondary infections or post-operative complications because of a disease, disorder or treatment resulting in a reduced ability to mobilize the body's normal metabolic responses to infection. Treatment with the soluble glucans has been shown to be particularly effective in mobilizing the host's normal immune defenses, thereby engendering a measure of protection from infection in the treated host.

The present composition is generally administered to an animal or a human in an amount sufficient to produce immune system enhancement. The mode of administration of the soluble glucan can be oral, enteral, parenteral, intravenous, subcutaneous, intraperitoneal, intramuscular, topical or intranasal. The form in which the composition will be administered (e.g., powder, tablet, capsule, solution, emulsion) will depend on the route by which it is administered. The quantity of the composition to be administered will be determined on an individual basis, and will be based at least in part on consideration of the severity of infection or injury in the patient, the patient's condition or overall health, the patient's weight and the time available before surgery, chemotherapy or other high-risk treatment. In general, a single dose will preferably contain approximately 0.01 to approximately 10 mg of modified glucan per kilogram of body weight, and preferably from about 0.1 to 2.5 mg/kg. The dosage for topical application will depend upon the particular wound to be treated, the degree of infection and severity of the wound. A typical dosage for wounds will be from about 0.001 mg/mL to about 2 mg/mL, and preferably from about 0.01 to about 0.5 mg/mL.

In general, the compositions of the present invention can be administered to an individual periodically as necessary to stimulate the individual's immune response. An individual skilled in the medical arts will be able to determine the length of time during which the composition is administered and the dosage, depending on the physical condition of the patient and the disease or disorder being treated. As stated above, the composition may also be used as a preventative treatment to pre-initiate the normal metabolic defenses which the body mobilizes against infections.

Soluble β-glucan compositions can be used for the prevention and treatment of infections caused by a broad spectrum of bacterial, fungal, viral and protozoan pathogens. The prophylactic administration of soluble β-glucan to a person undergoing surgery, either preoperatively, intraoperatively and/or post-operatively, will reduce the incidence and severity of post-operative infections in both normal and high-risk patients. For example, in patients undergoing surgical procedures that are classified as contaminated or potentially contaminated (e.g., gastrointestinal surgery, hysterectomy, cesarean section, transurethral prostatectomy) and in patients in whom infection at the operative site would present a serious risk (e.g., prosthetic arthroplasty, cardiovascular surgery), concurrent initial therapy with an appropriate antibacterial agent and the present soluble glucan preparation will reduce the incidence and severity of infectious complications.

In patients who are immunosuppressed, not only by disease (e.g., cancer, AIDS) but by courses of chemotherapy and/or radiotherapy, the prophylactic administration of the soluble glucan will reduce the incidence of infections caused by a broad spectrum of opportunistic pathogens including many unusual bacteria, fungi and viruses. Therapy using soluble β-glucan has demonstrated a significant radio-protective effect with its ability to enhance and prolong macrophage function and regeneration and, as a result enhance resistance to microbial invasion and infection.

In high risk patients (e.g., over age 65, diabetics, patients having cancer, malnutrition, renal disease, emphysema, dehydration, restricted mobility, etc.) hospitalization frequently is associated with a high incidence of serious nosocomial infection. Treatment with soluble β-glucan may be started empirically before catheterization, use of respirators, drainage tubes, intensive care units, prolonged hospitalizations, etc. to help prevent the infections that are commonly associated with these procedures. Concurrent therapy with antimicrobial agents and the soluble β-glucan is indicated for the treatment of chronic, severe, refractory, complex and difficult to treat infections.

The compositions administered in the method of the present invention can optionally include other components, in addition to the soluble β-glucan. The other components that can be included in a particular composition are determined primarily by the manner in which the composition is to be administered. For example, a composition to be administered orally in tablet form can include, in addition to soluble β-glucan, a filler (e.g., lactose), a binder (e.g., carboxymethyl cellulose, gum Arabic, gelatin), an adjuvant, a flavoring agent, a coloring agent and a coating material (e.g., wax or plasticizer). A composition to be administered in liquid form can include soluble β-glucan and, optionally, an emulsifying agent, a flavoring agent and/or a coloring agent. A composition for parenteral administration can be mixed, dissolved or emulsified in water, sterile saline, PBS, dextrose or other biologically acceptable carrier. A composition for topical administration can be formulated into a gel, ointment, lotion, cream or other form in which the composition is capable of coating the site to be treated, e.g., wound site.

The soluble glucan composition of the invention can also be administered topically to a wound site to stimulate and enhance wound healing and repair. Wounds due to ulcers, acne, viral infections, fungal infections or periodontal disease, among others, can be treated according to the methods of this invention to accelerate the healing process. Alternatively, the soluble β-glucan can be injected into the wound or afflicted area. In addition to wound repair, the composition can be used to treat infection associated therewith or the causative agents that result in the wound. A composition for topical administration can be formulated into a gel, ointment, lotion, cream or other form in which the composition is capable of coating the site to be treated, e.g., wound site. The dosage for topical application will depend upon the particular wound to be treated, the degree of infection and severity of the wound. A typical dosage for wounds will be from about 0.01 mg/mL to about 2 mg/mL, and preferably from about 0.01 to about 0.5 mg/mL.

Another particular use of the compositions of this invention is for the treatment of myelodysplastic syndrome (MDS). MDS, frequently referred to as preleukemia syndrome, is a group of clonal hematopoietic stem cell disorders characterized by abnormal bone marrow differentiation and maturation leading to peripheral cytopenia with high probability of eventual leukemic conversion. Recurrent infection, hemorrhaging and terminal infection resulting in death typically accompany MDS. Thus, in order to reduce the severity of the disease and the frequency of infection, compositions comprising modified glucan can be chronically administered to a patient diagnosed as having MDS according to the methods of this invention, in order to specifically increase the infection fighting activity of the patient's white blood cells. Other bone marrow disorders, such as aplastic anemia (a condition of quantitatively reduced and defective hematopoiesis) can be treated to reduce infection and hemorrhage that are associated with this disease state.

The soluble β-glucan compositions of the present invention enhance the non-specific defenses of mammalian mononuclear cells and significantly increases their ability to respond to an infectious challenge. The unique property of soluble glucan macrophage activation is that it does not result in increased body temperatures (i.e., fever) as has been reported with many non-specific stimulants of those defenses. This critical advantage of soluble glucan may lie in the natural profile of responses it mediates in white blood cells.

The soluble β-glucan compositions of the invention are also of use in methods of inducing or enhancing mobilization of peripheral blood precursor cells, elevating circulating levels of peripheral blood precursor cells and enhancing or facilitating hematopoietic reconstitution or engraftment in mammals, including humans. Peripheral blood precursor cells include stem cells and early progenitor cells which, although more differentiated than stem cells, have a greater potential for proliferation than stem cells. These methods comprise administering to the mammal an effective amount of a β-glucan composition of the present invention. Such methods are of use, for example, in the treatment of patients undergoing cytoreductive therapy, such as chemotherapy or radiation therapy.

The invention is further illustrated by the following Examples.

EXAMPLES

Example 1

Temperature Dependence of PGG-glucan Conformation

Fractionation of PGG-glucan at 25° C. and 37° C.

A PGG-glucan composition prepared as described in U.S. Pat. No. 5,622,939 was concentrated to approximately 20 mg/mL. An aliquot of the concentrated sample was fractionated at 25° C. on a preparative scale gel permeation chromatography column (5 cm TSK HW55F resin column) using 0.15 M sodium chloride as the mobile phase. As shown in FIG. 1, the composition eluted as a single symmetrical band.

A second aliquot of the concentrated sample was fractionated on a preparative GPC column maintained in a hot room at 37° C. The PGG-glucan eluted from the column in two distinct fractions, as shown in FIG. 1. These fractions were collected and designated Fraction A and Fraction C.

Characterization of Fractions A and C

The molecular weights of each fraction at pH 7 and 25° C., 37° C., and 75° C., and at pH 13 and 25° C. are presented in Table 1. For each fraction, molecular weight decreases with increasing temperature. The aggregate numbers of each fraction at pH 7 and 25° C., 37° C., and 75° C. are shown in Table 2. At 25° C., each fraction has an aggregate number greater than 6, indicating that each fraction is predominantly in a triple helix aggregate conformation at this temperature. At 37° C., Fraction A remains predominantly in a triple helix aggregate conformation, while Fraction C is predominantly in a single triple helix conformation. At 5° C., however, Fraction A remains predominantly in a single triple helix conformation, while Fraction C is predominantly in a single chain random-coil conformation.

Figure 4:
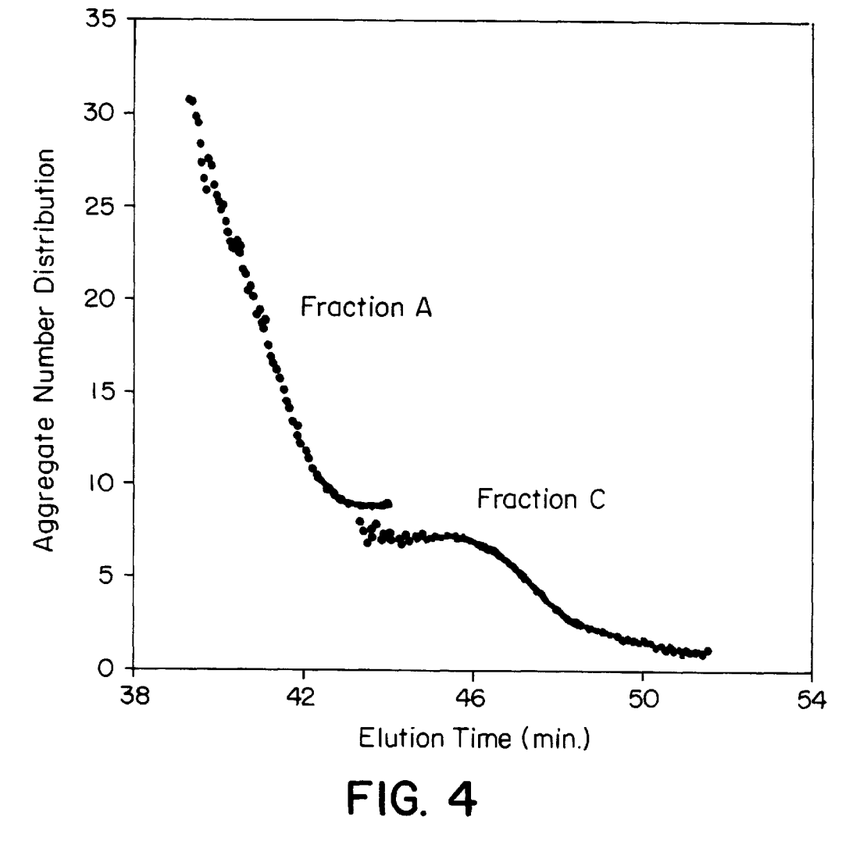
FIG. 4 presents the aggregate number distribution of Fractions A and C at pH 7 and 25° C. across the entire molecular weight range.

The aggregate number distribution of each fraction at pH 7 and 25° C. was studied using the gel permeation chromatography/MALLS/post-column reaction system previously described and shown in FIG. 3. FIG. 4 shows the aggregate number distribution for Fractions A and C. Fraction A includes aggregate numbers from about 30 to about 9, while Fraction C has aggregate numbers from about 7 to 1. At 25° C., Fraction A is predominantly in a triple helix aggregate conformation (aggregates of about 3 to 10 triple helices), while Fraction 4 includes both triple helix aggregates and single triple helices.

The temperature dependence of the PGG-Glucan conformation was also characterized by dynamic light scattering methods. The hydrodynamic size of each fractions at pH 7 and both 25° C. and 40° C. were measured using a Nicomp 370 submicron Particle Sizer with an argonion laser (NICOMP Particle Sizing Systems). Table 3 presents the hydrodynamic size of Fraction A and Fraction C at both 25° C. and 40° C. The hydrodynamic size of Fraction A does not change with increasing temperature from 25° C. to 40° C., while the hydrodynamic size of Fraction C is significantly reduced.

Figure 5:
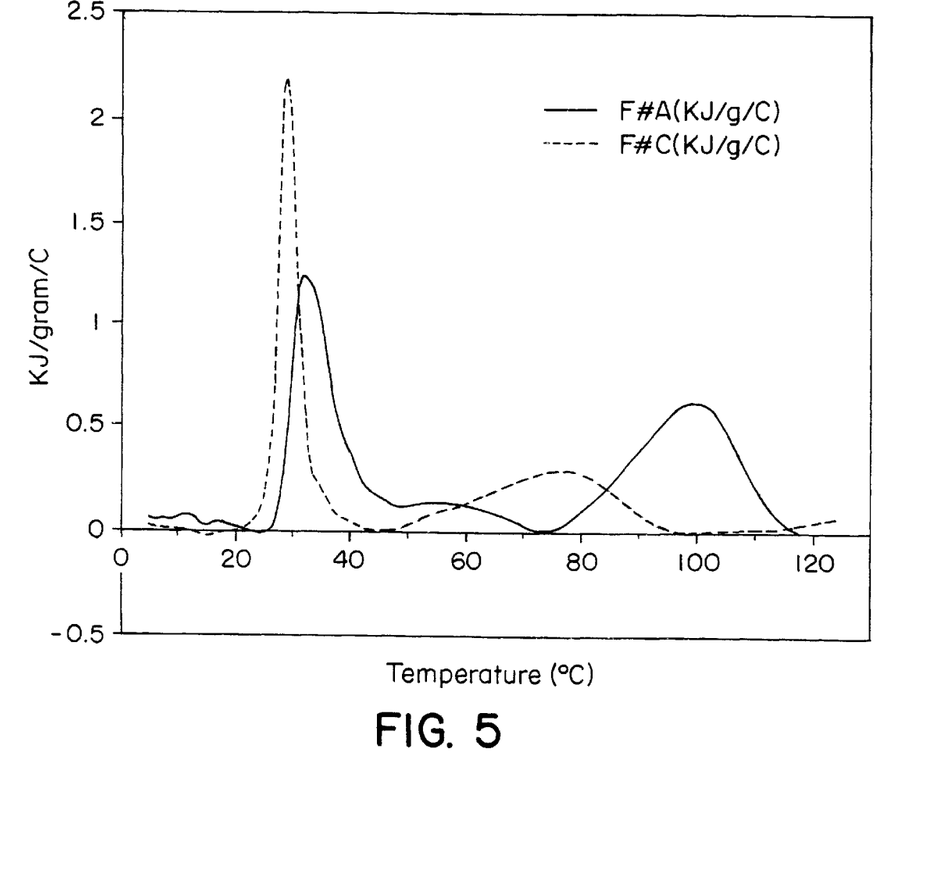
FIG. 5 is a graph showing microcalorimetry data for Fractions A and C.

The temperature dependence of the conformation of Fractions A and C was studied using a Nano Differential Scanning Calorimeter (Nano-DSC, Calorimetry Sciences Corp.). The calorimeter was run from 0° C. to 125° C. at a scan rate of 1° C./min. FIG. 5 displays two thermal transitions from about 30 to 70° C. and 75 to 120° C. for Fraction A and from about 30 to 40° C. and 50 to 90° C. for Fraction C. Based on the molecular weight and aggregate number data (see Tables 1 and 2), the first transition is a helix-helix transition caused by disaggregation of triple helix aggregates to single triple helices, while the second transition represents a helix-coil transition, such as denaturation of a single triple helix to a single chain random-coil conformation. Fraction A completely denatures at 120° C., while Fraction C completely denatures at 90° C. For shizophyllan, a triple helix to random-coil transition occurs at about 130° C. (Stokke et al., *Biopolymers*, 33: 193–198 (1993)).

Figure 6:
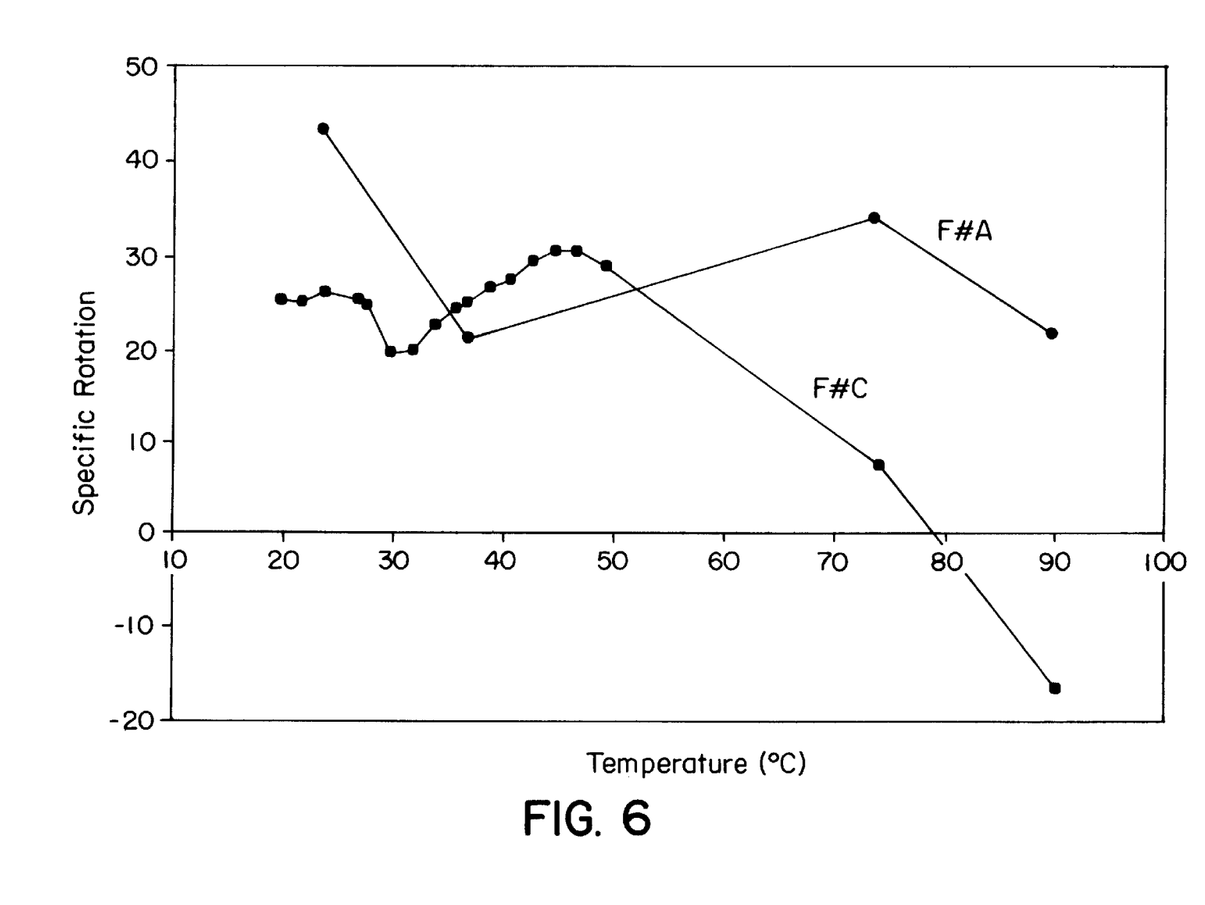
FIG. 6 is a graph showing changes in specific rotation as a function of temperature for Fractions A and C.

Polarimetry techniques have also been used to study the conformational transition of polysaccharides (Ogawa et al., *Carbohydrate Research*, 23: 399–405 (1972)). Temperature dependence of Fraction A and Fraction C conformational changes were measured using an Auto-Poll V (Rudolph, Inc.) polarimeter. FIG. 6 presents specific optical rotation changes of Fractions A and C with increasing temperature. These results confirm that conformation of Fraction A is substantially triple helix aggregate or single triple helix within the temperature range from 25° C. to 90° C. However, while Fraction C is substantially in a triple helix aggregate or single triple helix conformation from 25° C. to 70° C., above 80° C. the conformation is predominantly a denatured random coil.

TABLE 1

Average Molecular Weight Values of Fractions A and C at 25° C. and 37° C.

| | Molecular Weight | | | |
|---|---|---|---|---|
| Fraction | pH 13, 25° C. | pH 7, 25° C. | pH 7, 37° C. | pH 7, 75° C. |
| Fraction A | 16,000 | 238,000 | 164,00 | 52,600 |
| Fraction C | 12,000 | 71,500 | 32,000 | 17,200 |

TABLE 2

Aggregate Number of Fractions A and C at 25° C. and 37° C.

| | Aggregate Number | | |
|---|---|---|---|
| Fraction | pH 7, 25° C. | pH 7, 37° C | pH 7, 75° C. |
| Fraction A | 15.0 | 10.3 | 3.3 |
| Fraction C | 6.0 | 2.7 | 1.4 |

TABLE 3

Hydrodynamic size of Fractions A and C measured by dynamic light scattering

| Fraction | 20° C. (mass distribution) | 40° C. (mass distribution) |
|---|---|---|
| Fraction A | 12.5 nm (100%) | 11.4 nm (63%) 3.5 nm (37%) |
| Fraction C | 10.2 nm (100%) | 9.2 nm (23%) 3.5 nm (73%) |

Example 2

Fractionation of PGG-glucan and Characterization of Fractions

A PGG-glucan composition prepared according to the method described in U.S. Pat. No. 5,622,939 was concentrated from 3.1 mg/mL to about 20 mg/mL. The concentrated sample was fractionated by preparative scale GPC on a 5 cm TSK HW55F resin column (Toso Hass) at 25° C. Three samples were collected from the single symmetrical elution band. Samples from the leading edge, the trailing edge and the center of the band were collected to provide Fractions 1, 2 and 3 in order of elution.

FIG. 7 is an overlay of the elution profiles of Fractions 1, 2 and 3.

Characterization of Fractions 1, 2 and 3

The conformations of Fractions 1, 2 and 3 were further characterized by a variety of techniques, including GPC and multi-angle laser light scattering (MALLS).

The molecular weights of each fraction at pH 7 and both 25° C. and 37° C. are presented in Table 4, along with the polydispersity of each value. For each fraction, molecular weight decreases with increasing temperature. Table 5 present the molecular weight for each fraction at 25° C. and pH 13. Table 6 presents the aggregate number of each fraction at pH 7 and both 25° C. and 37° C. At 25° C., each of the fractions has an aggregate number greater than 6, indicating that each fraction is predominantly in a triple helix aggregate conformation at this temperature. At 37° C., however, Fractions 1 and 2 remain predominantly in a triple helix aggregate conformation while Fraction 3 is predominantly in a single triple helix conformation.

TABLE 4

Absolute Mw measured by HR-GPC/MALLS at pH 7

| SAMPLES | 25° C. | | 37° C. | |
| --- | --- | --- | --- | --- |
| | Mw | Pd | Mw | Pd |
| Fraction 1 | 244,100 | 1.22 | 164,100 | 1.70 |
| Fraction 2 | 156,600 | 1.09 | 109,100 | 1.30 |
| Fraction 3 | 104,300 | 1.14 | 51,760 | 1.14 |

TABLE 5

Absolute Mw measured by GPC/MALLS at pH 13 and 25° C.

| SAMPLES | Mw | Pd |
| --- | --- | --- |
| Fraction 1 | 21,500 | 1.1 |
| Fraction 2 | 18,280 | 1.1 |
| Fraction 3 | 13,620 | 1.1 |

TABLE 6

Aggregate Numbers at 25° C. and 37° C.

| | Aggregate Number | |
| --- | --- | --- |
| SAMPLES | 25° C. | 37° C. |
| Fraction 1 | 11.3 | 7.6 |
| Fraction 2 | 8.6 | 6.0 |
| Fraction 3 | 7.7 | 3.8 |

EQUIVALENTS

Those skilled in the art will recognize or be able to ascertain, using no more than routine experimentation, many equivalents to the specific materials and components described herein. Such equivalents are intended to be encompassed in the scope of the following claims:

We claim:

1. A soluble β-glucan composition having an aggregate number greater than about 6 under physiological conditions, said composition consisting essentially of β-glucan chains having a molecular weight between about 1000 daltons and about 100,000 daltons.

2. The soluble glucan composition of claim 1 wherein the physiological conditions include a pH of 7.0 and a temperature of 37° C.

3. The soluble β-glucan of claim 1 having an aggregate number greater than about 7 under physiological conditions.

4. The soluble β-glucan of claim 3 having an aggregate number greater than about 8 under physiological conditions.

5. A process for producing a soluble β-glucan composition wherein at least a portion of the β-glucan polymer chains adopt a triple helix aggregate conformation under physiological conditions, said process comprising the step of cleaving at least a portion of the branches from the β-glucan polymer chains of a highly branched β-glucan composition, thereby forming a partially debranched β-glucan composition wherein at least a portion of the β-glucan polymer chains adopt a triple helix aggregate conformation under physiological conditions.

6. The process of claim 5 wherein the highly branched β-glucan is at least about 25% branched.

7. The process of claim 6 wherein the highly branched β-glucan is selected from the group consisting of scleroglucan, schizophyllan, lentinan, cinerean, grifolan and pestalotan.

8. The process of claim 5 wherein the partially debranched β-glucan is about 10% branched or less.

9. The method of claim 5 wherein the highly branched β-glucan comprises branches connected to the β-glucan chains by β(1,6)-glycosidic bonds.

10. The method of claim 9 wherein the branches are cleaved from the β-glucan polymer chains by reacting the highly branched β-glucan composition with a β-(1,6)-glycosidase under conditions sufficient for cleavage of at least a portion of the branches from the β-glucan polymer chains.

11. A method for determining the aggregate number distribution of a β-glucan composition comprising the steps of:

(a) directing a first aliquot of a β-glucan solution through a gel permeation chromatography column to elute a β-glucan fraction;

(b) determining the molecular weight of the β-glucan fraction;

(c) directing a second aliquot of the β-glucan solution through a gel permeation chromatography column to elute a second β-glucan fraction corresponding to the β-glucan fraction of step (a);

(d) denaturing the second β-glucan fraction into single β-glucan chains;

(e) determining the molecular weight of the single polymer chains; and (f) determining the ratio of the molecular weight determined in step (b) to the molecular weight determined in step (e) to obtain the aggregate number of the β-glucan fraction.

12. The method of claim 11 wherein the second β-glucan fraction is denatured by treating said fraction with base.

13. The method of claim 12 wherein the base has a pH of at least about 12.

14. The method of claim 13 wherein the base has a pH of at least about 13.

15. The method of claim 11 wherein the molecular weights of the first and second β-glucan fractions is determined by multi-angle laser light scattering or on-line viscometry.

* * * * *